(12) United States Patent
Cui et al.

(10) Patent No.: US 8,015,556 B2
(45) Date of Patent: Sep. 6, 2011

(54) EFFICIENT METHOD OF DATA RESHAPING FOR MULTIDIMENSIONAL DYNAMIC ARRAY OBJECTS IN THE PRESENCE OF MULTIPLE OBJECT INSTANTIATIONS

(75) Inventors: Shimin Cui, Toronto (CA); Raul E. Silvera, Woodbridge (CA)

(73) Assignee: International Business Machines Corporation, Armonk, NY (US)

( * ) Notice: Subject to any disclaimer, the term of this patent is extended or adjusted under 35 U.S.C. 154(b) by 1287 days.

(21) Appl. No.: 11/548,725

(22) Filed: Oct. 12, 2006

(65) Prior Publication Data

US 2008/0091697 A1    Apr. 17, 2008

(51) Int. Cl.
*G06F 9/45* (2006.01)
(52) U.S. Cl. ......... 717/154; 717/143; 717/151; 717/155
(58) Field of Classification Search .......... 717/140–161, 717/154
See application file for complete search history.

(56) References Cited

U.S. PATENT DOCUMENTS

| | | | | |
|---|---|---|---|---|
| 5,408,660 | A * | 4/1995 | Kitadate | 717/144 |
| 5,535,391 | A * | 7/1996 | Hejlsberg et al. | 717/140 |
| 6,530,079 | B1 * | 3/2003 | Choi et al. | 717/158 |
| 6,813,761 | B1 * | 11/2004 | Das et al. | 717/132 |
| 6,817,009 | B2 * | 11/2004 | Flanagan et al. | 717/126 |
| 7,058,943 | B2 * | 6/2006 | Blais et al. | 718/1 |
| 7,076,773 | B2 * | 7/2006 | Schmidt | 717/148 |
| 7,240,337 | B2 * | 7/2007 | Kawahito et al. | 717/136 |
| 7,257,685 | B2 * | 8/2007 | Tene et al. | 711/154 |
| 7,500,232 | B2 * | 3/2009 | Das et al. | 717/154 |
| 2003/0046671 | A1 * | 3/2003 | Bowen | 717/141 |
| 2005/0071349 | A1 | 3/2005 | Jordan et al. | |
| 2005/0108697 | A1 * | 5/2005 | Ogasawara et al. | 717/152 |
| 2005/0131924 | A1 | 6/2005 | Jones | |
| 2005/0198625 | A1 * | 9/2005 | Shi et al. | 717/153 |
| 2005/0198626 | A1 * | 9/2005 | Kielstra et al. | 717/156 |
| 2007/0240137 | A1 * | 10/2007 | Archambault et al. | 717/140 |
| 2008/0052693 | A1 * | 2/2008 | Archambault et al. | 717/151 |

OTHER PUBLICATIONS

Cherem, Sigmund and Radu, Rugina Compile-Time Deallocation of Individual Objects. Proceedings of the 5th international symposium on Memory management. Jun. 2006.*

(Continued)

*Primary Examiner* — Wei Y Zhen
*Assistant Examiner* — Matthew J Brophy
(74) *Attorney, Agent, or Firm* — Cantor Colburn LLP; Dermott Cooke

(57) ABSTRACT

A method of data reshaping for multidimensional dynamic array objects in the presence of multiple object instantiations. The method includes collecting all alias information using interprocedural point escape analysis, and collecting all shape information using interprocedural shape analysis. The method progresses with selecting the candidate dynamic objects based on alias and shape analysis, and determining the types of data reshaping for the candidate dynamic objects. The method further includes creating objects for selected dynamic objects with multiple object instantiations. The method proceeds by updating the memory allocation operations for the selected dynamic objects and inserting statements to initialize object descriptors. The method further includes creating the copy of the object descriptors for selected dynamic object assignments. The method concludes by replacing the object references by array-indexed references for selected dynamic objects using object descriptors.

7 Claims, 4 Drawing Sheets

OTHER PUBLICATIONS

Field Flow Sensitive Pointer and Escape Analysis for Java Using Heap Array SSA Prakash Prabhu; Priti Shankar. Lecture Notes in Computer Science Jul. 14, 2008 .vol. 5079.*

Compositional pointer and escape analysis for Java programs. Whaley.John; Rinard.Martin. Proceedings of the Conference on Object-Oriented Programming Systems 19990000. vol. 34,Iss.10;p. 187-206.*

Incrementalized pointer and escape analysis. Vivien.F; Rinard.M. Proceedings of the ACM SIGPLAN Conference on Programming Language Design and Implementation (PLDI) 20010000.p. 35-46.*

* cited by examiner

Figure 2

```
typedef struct {
    float x;
    float y;
} XY;

XY  *p, *q;
float **P, **Q;

init (int n, int m)  {
    p = malloc (n * sizeof (XY));

P= malloc (n * sizeof (float *));
    for (i = 0; i < n; ++i)  {
        P[i] = (float *) calloc (m * sizeof (float));
    }
} foo ()  {
    init (N1, N1);
    q = p;
    Q = P;

init (N2, N2);
} bar ()  {
    for (i = 0; i < N1; ++i)  {
        for (j = 0; j < N1; ++j)   {
            q[i].y = q[i].y + Q[i][j] ;    // * (*(Q+i)+j)
        }
    } for (i = 0; i < N2; ++i)  {
        for (j + 0; j < N2;  ++j)  {
            p[i].x = p[i].x - P[i][j];    // * (*(P+i)+j)
        }
    }
}
```

Figure 3
```
typedef struct {
    float x;
    float y;
} XY;

typedef struct {
    float *base;
    float *base_x;
    float *base_y;
} DESC_SPLIT;

typedef struct {
    float *base
    int    stride_1;
} DESC_MERGE;

DESC_SPLIT   *p, *q;
DESC_MERGE *P, *Q;

Init (int n, int m) {
   p = malloc (sizeof (DESC_SPLIT) + n * sizeof (XY));
   p-> base = p + sizeof (DESC_SPLIT);
   p-> base_x = p->base;
   p-> base_y = p->base_x + n * sizeof (float);

P= calloc (sizeof (DESC_MERGE) + n * m * sizeof (float));
   P->base = P + sizeof (DESC_MERGE);
   P->stride_1 = n;
} foo ( ) {
   init (N1, N1);
   q = p;
   Q = P;
   Init (N2, N2);
} bar ( ) {
   for (i =0; i < N1; ++i) {
      for (j = 0; j< N1; ++j) {
         q->base_y [i] = q->base_y [i] + Q->base [i] [j]; //
 * (Q->base + (Q->stride_1*i+j))
      }
    }
     for (i=0; i < N2; ++i) {
        for (j = 0; j < N2; ++j) {
           p->base_x[i] = p->base_x [i] − P->base [i] [j]; //
 * (P->base+(P->stride_1*i +j))
        }
     }
}
```

EFFICIENT METHOD OF DATA RESHAPING FOR MULTIDIMENSIONAL DYNAMIC ARRAY OBJECTS IN THE PRESENCE OF MULTIPLE OBJECT INSTANTIATIONS

TRADEMARKS

IBM® is a registered trademark of International Business Machines Corporation, Armonk, N.Y. U.S.A. Other names used herein may be registered trademarks, trademarks or product names of International Business Machines Corporation or other companies.

BACKGROUND

1. Field of Invention

This invention relates in general to data caches, and more particularly, to data structure reordering.

2. Description of Background

Data cache efficiency is a major performance bottleneck in modern computer systems. Extensive research effort has been dedicated to the improvement of data cache utilization on data layout transformation, typically array padding and array data structure reordering are utilized to exploit data reuse. These optimizations are particularly effective in the domain of scientific computing in which programs operate extensively on arrays.

Nowadays, many applications also make extensive use of pointers to store data using low-level programming languages that support pointers, such as C and C++. The pointer-intensive programs are a difficult challenge for modern computer architectures and memory hierarchies. Typical pointer-based heap allocated data tends to have less regular access pattern with much worse reference locality than an array. An effective way to overcome this drawback is to allocate data in a manner to increase the programs' reference locality.

The recent work provides a practical, safe, and automatic data reshaping and data merging framework that reorganizes dynamic arrays of objects to improve data locality. Two major approaches have been described for reorganizing these data structures: Arithmetic-based reshaping relies on a mathematical formula to map object components from their original location to their remapped location. Pointer-based reshaping introduces pointers inside the original data structure to indicate where some components have been relocated.

It has been shown that arithmetic-based reshaping always performs better than the pointer-based reshaping, as it requires no additional components to be introduced and maintained inside the structure. Yet, so far arithmetic-based reshaping has been restricted to single-instantiation cases to avoid unsafe code transformations. The single-instantiation restriction says that there must be a single allocation point for a particular object type, and that this point must be executed no more than once at run time so that the base address of the object is a constant at runtime. However, many programs operate on data structures that are typically not allocated monolithically into a dynamic object. Even in cases where there is effectively a single instantiation at runtime, it may be difficult or even impossible for a compiler to statically prove that the call site will only be executed no more than once. The challenge to handle individually allocated objects imposes the difficult task upon a user to analyze all the dynamically placed objects involved in a data structure at compile time and to do a safe code transformation.

Thus, there is a need for a method that provides a novel and efficient method for dynamically allocated data reshaping with multiple object instantiations.

SUMMARY OF THE INVENTION

The shortcomings of the prior art are overcome and additional advantages are provided through the provision of a method of data reshaping for multidimensional dynamic array objects in the presence of multiple object instantiations. The method includes collecting all alias information using interprocedural pointer escape analysis. The method progresses with collecting all shape information using interprocedural shape analysis. The method further includes selecting the candidate dynamic objects based on alias and shape analysis, and determining the types of data reshaping for the candidate dynamic objects. Subsequently, the method proceeds by creating objects for selected dynamic objects with multiple object instantiations. Afterwards, the method progresses by updating the memory allocation operations for the selected dynamic objects, and inserting statements to initialize object descriptors. The method further includes creating the copy of the objects for selected dynamic object assignments. The method concludes with replacing the object references by array-indexed references for selected dynamic objects using object descriptors.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for a method of data reshaping for multidimensional dynamic array objects in the presence of multiple object instantiations.

BRIEF DESCRIPTION OF THE DRAWINGS

The subject regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of computer software code that is amenable to improvement by data reshaping with multiple object instantiations;

FIG. 3 illustrates one example of the computer software code shown in FIG. 2, following an optimization of data reshaping.

The detailed description explains an exemplary embodiment of the invention, together with advantages and features, by way of example with reference to the drawings.

DETAILED DESCRIPTION OF THE INVENTION

A safe and efficient data reshaping method is disclosed to reorganize multidimensional dynamic array objects with multiple object instantiations to improve data locality, in order to improve the performance in the execution of the compiled code.

An intermediate representation of computer code is generated and used including a call graph, a control flow graph, and a data flow graph. The compiler system carries out two-pass traversal of the call graph in the intermediate representation of the code being compiled. This two-pass analysis avoids redundant computation by performing incremental update of reference marking with a minimal number of computations per procedure.

Alias and shape analysis is used to efficiently identify data reshaping opportunities for multiple instantiated objects. An object descriptor is created for dynamic objects for safe code transformation for data reshaping.

Figure 1:
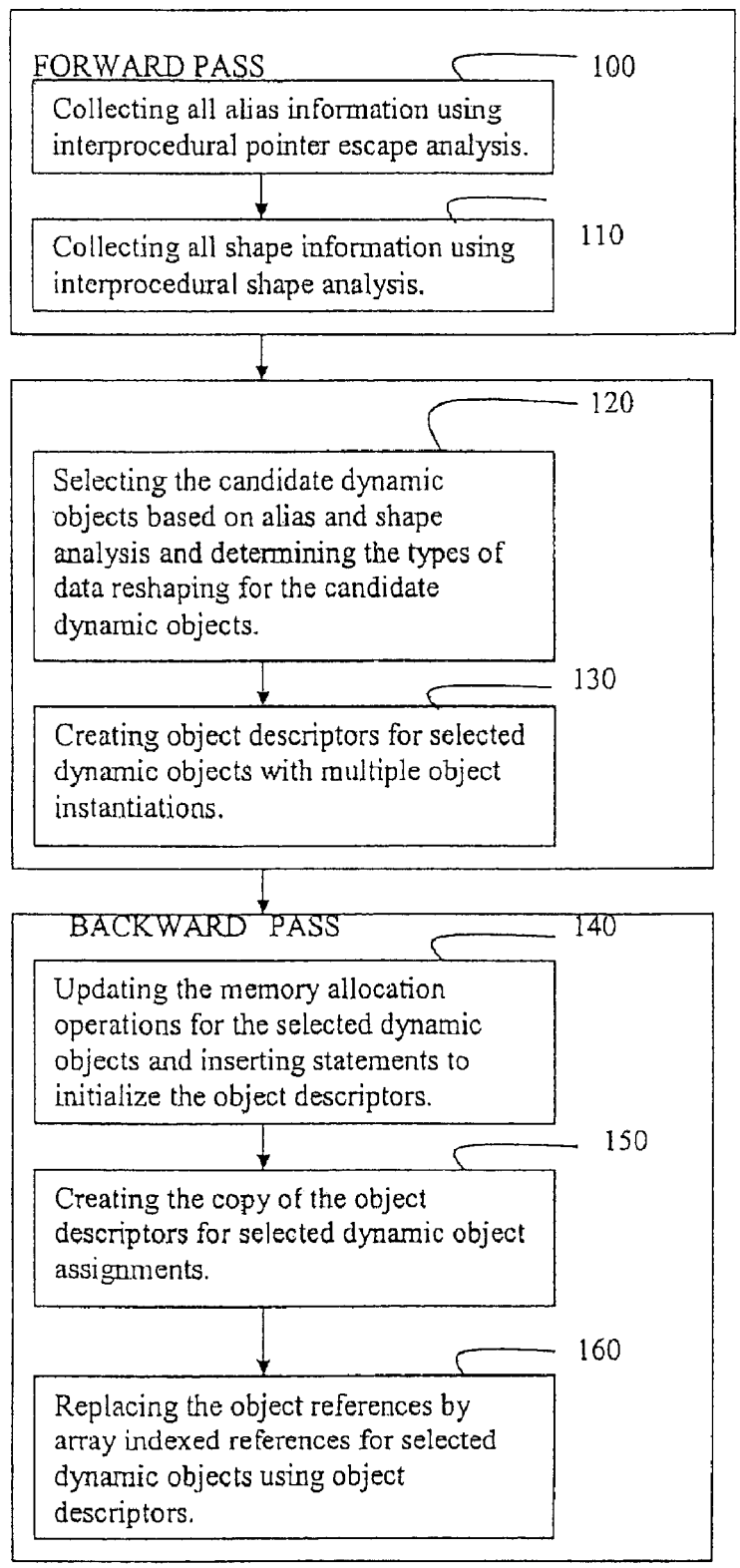
FIG. 1 illustrates one example of a method of data reshaping for multidimensional dynamic array objects in the presence of multiple object instantiations.

Referring to FIG. 1, a method of data reshaping for multi-dimensional dynamic array objects in the presence of multiple object instantiations, is shown. The method commences at step 100, in which the alias information is collected using interprocedural pointer escape analysis. Subsequently, at step 110, the shape information is collected using interprocedural shape analysis.

At step 120, the candidate dynamic objects based on alias and shape analysis are selected. Furthermore, the type of data reshaping for the candidate dynamic objects are determined. Afterwards, at step 130, objects are created for selected dynamic objects with multiple object instantiations.

At step 140, the memory allocation operations for the selected dynamic objects are updated. This update includes the insertion of a statement to initialize the object descriptors. The copy of the object descriptors is created for selected dynamic object assignments at step 150. In conclusion at step 160, the object references are replaced by array-indexed references for selected dynamic objects using object descriptors.

The system's method traverses each node in the call graph in the intermediate representation of the code being compiled in reverse depth-first order (top-down). If the intermediate representation for a procedure is not available, then the procedure is identified as an undefined procedure, for example, assembler code being linked to the compiled code, otherwise the procedure is a defined procedure. For each defined procedure reached in the top-down traversal of the call graph, the system collects the alias information and shape information with interprocedural pointer alias analysis and shape analysis. The interprocedural pointer analysis can be flow sensitive or flow insensitive. It collects the alias information of data objects that may reside in the same memory location. Whenever a pointer assignment (including passing pointer as parameter, function returning pointer) is met in the analysis, the alias sets represented by the right-hand side pointer and by the left-hand side pointer are merged. The alias information is refined during traversal of the call-graph, and is finalized at the end of the traversal.

The interprocedural data shape analysis is field sensitive in order to reshape compatible data. It tracks the types of aggregate fields, allocation sites, and the access patterns of the data objects. Two aggregated data types are compatible if they have the same number of fields with each corresponding field having the same length and offset. Two arrays are compatible if both their element types are compatible and they have the same dimensions with each corresponding dimension having the same stride. Two pointers are compatible if they point to the compatible data. Whenever an incompatibility is found in an alias set, it is not considered for data reshaping.

When the entire intermediate representation of the code to be compiled has been traversed, the system analyses the information to select the candidate for data reshaping on the type-safe analysis. For each alias set, the system will analyze its access pattern, its allocation information and its points-to set to decide the candidacy of the pointer. A dynamic pointer is considered as a candidate if (i) the access pattern for each leveled dynamic pointer is consistent, and (ii) the shape of all of its points-to fields is compatible in the whole program.

Referring to FIG. 2, where an illustration of C-style computer software code that may be optimized in compilation by the interprocedural compilation method is shown. In the example of FIG. 2, variables p and q are global pointers to type struct XY. Variables P and Q are global pointers to pointer to type float. All these pointers are dynamic pointers. The function init is called twice and thus the pointers p and P are instantiated twice at runtime. Because of the equivalence between array and pointer notation, the array notation is used in the source code to access individual elements of the array.

In the example of FIG. 2, the present method is used in an optimizing compiler to determine whether data reshaping is safe to be carried out based on the alias analysis and shape analysis. Both p and q are candidates for data splitting. Both P and Q are candidates for data merging.

Referring to FIG. 3, the resulting code after optimization is shown, this code may be further optimized if desired by a user.

The system is implemented in a link-phase portion of an optimizing compiler that generates an intermediate representation of the code, which includes a call graph. The call graph is a directed multi-grain in which the nodes represent procedures in the code being compiled, and the edges represent call points. In this application, the term procedure refers to functions and other programming language subroutines.

The method may also make use of a control flow graph and a data flow graph. The data structures of a control flow graph and a data flow graph, and their uses in an intermediate representation of code in an optimizing compiler are well understood in the compiler literature.

Referring to FIG. 2 again, pointers p and q are in the same alias set, and can be candidates for data splitting with multiple object instantiation. The collected information for p and q includes: Aliases (p, q): access (array type, dimension 1, stride 4), pointers-to (p[ ].x length 4, offset 0; q[ ].y length 4, offset 4), allocation (call graph edge 1). The pointers P and Q are in another alias set, and can be candidates for memory allocation merging with multiple object instantiation. The collected information for P and Q includes: Aliases (P, Q): access (array type, dimension 1, stride 4), points-to (P[ ], Q[ ]), allocation (call graph edge 2), and Aliases (P[ ], Q[ ]): access (array type, dimension 1, stride 4), points-to (P[ ][ ], Q[ ][ ]), allocation (call graph edge 3).

The system creates an object descriptor for each dynamic pointer set after the set is determined to be a candidate for data reshaping with multiple object instantiation. The object descriptor is to record information regarding the data reshaping transformation for each object instantiation. The object descriptor is introduced per object instantiation to record the information regarding the data reshaping transformation. The content of the object descriptor depends on the type of the data reshaping. For a data splitting candidate, a data partition plan determines how the fields in the original data should be reorganized into clusters of new data. Once the partition strategy is determined, an object descriptor is created, which may contain:

(1) The base address allocated for the dynamic pointer.
(2) The current address for the dynamic pointer. This may be omitted if there is no pointer copy with displacement in the whole program and thus the current address is always the same as the base address.

(3) The cluster base address for each new cluster.

When an object is split, the object descriptor may contain the base address allocated for the dynamic object and the cluster base address for each new cluster. Furthermore, the object descriptor may contain the current address for the dynamic object if it is not the same as the object descriptor base address during its lifetime.

For memory allocation merging candidate, the object descriptor may contain:
(1) The base address allocated for the level-0 dynamic pointer.
(2) The current address for the level-0 dynamic pointer. This may be omitted if there is no pointer copy with displacement in the whole program and thus the current address is always the same as the base address.
(3) The strides for each leveled dynamic object expect level-0 base.

When an object memory allocation is merged, the object descriptor may contain the base address allocated for the level 0 dynamic object and the strides for each leveled dynamic object except level 0 base. Furthermore, the object descriptor may contain the current address for the level 0 dynamic pointer provided it is not the same as its base address during its lifetime.

Regarding the example illustrated in FIG. 2, the object descriptor for pointers p and q contains (base, base_x, base_y) with maximum data splitting, and the object descriptor for pointers P and Q contains (base, stride_1) with memory allocation merging. In the example, the object descriptors have no field of current addresses since there is no pointer assignment with displacement.

Once all pointer information is examined and the data reshaping object descriptors are created, the system's method modifies the intermediate representation of the code being compiled. This step is well-suited for inclusion in a backward pass in an interprocedural optimizer in a compiler, in which the system's method traverses the call graph in the depth-first order (bottom-up).

Figure 4:
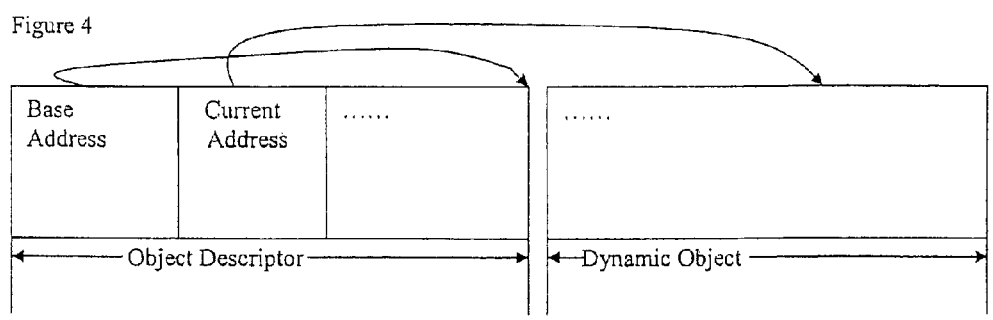
FIG. 4 illustrates one example of code transformation movement for the method disclosed in FIG. 1.

For memory allocation of a candidate dynamic pointer, the code transformation depends on the type of data reshaping. For data splitting, the allocation is replaced by an allocation with the total size of the reshaped data plus the size of the new descriptor and possible padding. For memory allocation merging, if the dynamic pointer is of type base, the allocation is replaced by an allocation with the total size of combined memory allocations with this base plus the size of the new descriptor and possible padding (the leveled memory allocation is simple removed). The padding could be added for alignment or another purpose, for example, to reduce the cache miss. The system uses the first chuck of bytes for the object, and the remaining bytes for the reshaped data, as shown in FIG. 4. In the memory allocation sites, statements are inserted to initialize the objects.

The copy of the object descriptor needs to be created when there is a pointer assignment with displacement, or a function returns a pointer with displacement, or a pointer with a displacement is passed as parameter since the current address may change for candidate pointers. Statements to create copies of the object descriptors are inserted when the current address may change.

For load operation of a candidate dynamic pointer, the code is transformed to an address computation using the objects. The stride is updated as necessary.

For reference of a field of a splitting candidate dynamic pointer, the code is transformed to an array indexed form using the cluster base address of the object descriptor. The stride is updated as necessary.

For dereference of a highest level of a merging candidate dynamic pointer, the code is transformed to an array indexed form using the stride of the object descriptor.

Referring to the example illustrated in FIG. 2, and the resulting code after data splitting and memory allocation merging shown in FIG. 3. After data reshaping is performed, other interprocedural or intraprocedural optimization techniques may be applied to further improve the performance in the execution of the compiled code.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of data reshaping for multidimensional dynamic array objects in the presence of multiple object instantiations, comprising:
    collecting all alias information using interprocedural pointer escape analysis;
    collecting all shape information using interprocedural shape analysis;
    selecting the candidate dynamic objects based on alias and shape analysis and determining the types of data reshaping for the candidate dynamic objects;
    creating object descriptors for selected dynamic objects with multiple object instantiations;
    updating the memory allocation operations for the selected dynamic objects and inserting statements to initialize the object descriptors;
    creating the copy of the object descriptors for selected dynamic object assignments; and
    replacing object references by array indexed references for selected dynamic objects using object descriptors;
    wherein when a pointer assignment is met in the interprocedural pointer escape analysis, alias sets represented by a right hand side pointer and by a left hand side pointer are merged.

2. The method of claim 1, wherein the interprocedural pointer escape analysis is configurable to be flow sensitive.

3. The method of claim 2, wherein the interprocedural pointer escape analysis is configurable to be flow insensitive.

4. The method of claim 1, wherein the interprocedural data shape analysis is field sensitive in order to reshape compatible data.

5. The method of claim 1, wherein the object descriptor is introduced per object instantiation to record information regarding the data shaping transformation.

6. The method of claim 5, wherein when an object is split, the object descriptor contains at least one of, (i) the base address allocated for the dynamic object, and (ii) the cluster base address for each new cluster, and (iii) the current address for the dynamic object provided the object descriptor does not match the object descriptor base address during the object descriptor lifetime.

7. The method of claim 5, wherein when object memory allocations are merged, the object descriptor contains at least one of, (i) the base address allocated for the level 0 dynamic object, and (ii) the strides for each leveled dynamic object except level 0 base, and (iii) the current address for the level 0 dynamic pointer provided the object descriptor does not match the object descriptor base address during the object descriptor lifetime.

* * * * *